united States Patent [15] 3,676,525
Wolf et al. [45] July 11, 1972

[54] HIGH MOLECULAR WEIGHT AROMATIC POLYAMIDES HAVING AN AFFINITY FOR BASIC DYES

[72] Inventors: Gerhard D. Wolf, Dormagen; Günter Blankenstein, Stommeln; Günter Nischk, Dormagen, Germany,

[73] Assignee: Farbenfabriken Bayer Aktiengesellschaft, Leverkusen, Germany

[22] Filed: April 7, 1971

[21] Appl. No.: 132,170

[30] Foreign Application Priority Data

April 13, 1970 Germany .....................P 20 17 509.1

[52] U.S. Cl. ...........................260/857 TW, 260/49, 260/50, 260/78 R, 260/857 R
[51] Int. Cl. .......................................................C08g 41/04
[58] Field of Search ...............................260/857 R, 857 TW

[56] References Cited

UNITED STATES PATENTS

| | | | |
|---|---|---|---|
| 3,403,200 | 9/1968 | Randall | 260/857 |
| 3,404,119 | 10/1968 | Harper | 260/857 |
| 3,477,899 | 11/1969 | Kubitzek | 260/857 |
| 3,514,498 | 5/1970 | Okazaki | 260/857 |
| 3,519,699 | 7/1970 | Pietrusza | 260/857 |

FOREIGN PATENTS OR APPLICATIONS

| | | | |
|---|---|---|---|
| 1,439,411 | 4/1966 | France | 260/857 |

*Primary Examiner*—Paul Lieberman
*Attorney*—Plumley & Tyner

[57] ABSTRACT

A polyamide composition of matter that can be dyed with basic dyestuffs comprising a conventional high molecular weight aromatic polyamide and 3 to 30 percent by weight of an aromatic polyamide containing 30 – 100 Mol percent of removing structural units with disulfone imide structures.

3 Claims, No Drawings

HIGH MOLECULAR WEIGHT AROMATIC POLYAMIDES HAVING AN AFFINITY FOR BASIC DYES

This invention relates to high molecular weight aromatic polyamides that can be dyed with basic dyes and contain a proportion of amide units with disulphimide structures.

As a rule, polyamides obtained, by interfacial polycondensation or by polycondensation in solution, from fully aromatic diamines or aromatic diamines containing heterocycles and aromatic dicarboxylic acid dihalides, do not show any affinity for basic dyes. In order to be able to dye aromatic polyamides with basic dyes, the necessary affinity for these dyes must be imparted to them by introducing acid groups. Thus, it is known that the dye absorption of aromatic polyamides can be improved by the addition of co-condensible carboxylic acid derivatives ( U.S. Pat. No. 3,380,696 ) or of co-condensable sulphonic acid derivatives ( published Netherlands Pat. application No. 67 17 240 ) or even of co-condensable compounds containing disulphimide structures ( German Pat. application No. P 20.00.927.2).

The fully aromatic polyamides or the aromatic heterocycle-containing polyamides are polymers that are unaffected by high temperatures, and must meet stringent requirements in regard to tensile strength and thermal stability. If diamines containing acid groups, for example, are co-condensed in a concentration of from 5 to 10 mol percent ( based on the total quantity of diamine), every tenth to twentieth diamine unit statistically distributed through the polyamide chain is derived from a diamine with an acid group. Although the dyeability of such copolyamides is greatly increased, their strength and thermal stability are impaired.

The present invention is based on the discovery that the outstanding properties of the polyamides show very little deterioration when the fundamental structure of the fully aromatic or aromatic heterocycle-containing homopolyamides is left intact, and instead as little as possible of a polyamide or copolyamide highly enriched with disulphimide groups is added to the polyamides in order to improve their affinity to dyes.

It is an object of this invention, therefore, to provide a polyamide composition of matter that can easily be dyed with basic dyestuffs, and the physical properties of which are not deteriorated. Further objects of the invention will be evident from the description and the examples. These objects are accomplished by a polyamide composition of matter that can be dyed with basic dyestuffs comprising a conventional high molecular weight aromatic polyamide and from 3 to 30 percent by weight, based on the composition as a whole of a polyamide which comprises from 30 to 100 mol percent of disulfoneimide segments of the formula:

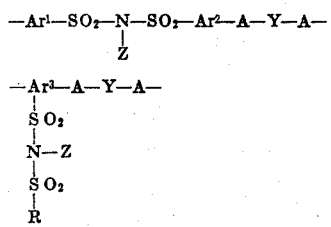

wherein each symbol

A represents a group of the formula —CONH— or —NHCO—,
Z represents a hydrogen or alkali metal atom,
R represents a $C_1$ to $C_4$ alkyl radical or an aromatic, alkyl-substituted aromatic or halogen-substituted aromatic radical;

$Ar^1$ and $Ar^2$, which can be the same or different, each represents a bivalent aromatic, alkyl-substituted aromatic or halogen-substituted aromatic radical, $Ar^3$ represents a trivalent aromatic, alkyl-substituted aromatic or halogen-substituted aromatic radical, and Y represents a divalent aromatic radical and from 0 to 70 mol percent of conventional aromatic polyamide segments.

$Ar^1$ and $Ar^2$ in the above formula which can be the same or different, preferably each represents a bivalent aromatic radical consisting of one aromatic ring or of two or more aromatic rings which are fused together or are attached to one another through a direct bond or through a —$CH_2$—, —O—, —S— or —$SO_2$— radical.

$Ar^3$ represents a trivalent aromatic radical, which can also consist of one aromatic ring or of two or more aromatic rings which are fused together or are attached to one another through a direct bond or through a —$CH_2$—, —O—, —S—, or —$SO_2$— group, or an alkyl or halogen-substituted aromatic radical.

In the context of the present invention conventional high molecular weight aromatic polyamides include, on the one hand, fully aromatic polyamides and, on the other hand, polyamides which in addition to aromatic radicals also contain heterocyclic radicals in the chain, but not those which contain aliphatic radicals in the chain.

The structural segments of conventional aromatic polyamides are derived from the following aromatic diamines and aromatic dicarboxylic acids: Diamines:

m- and p-phenylene diamine, 4,4'-Diaminodiphenylether, 4,4'-diaminodiphenylsulfide, 4,4'- and 4,3'-diaminobenzanilide, 2,6- and 2,7-diaminonaphthalene, benzidine, 1,3-bis-(p-amino-benzimido)-benzene, 1,4-bis-(m-aminobenzamido)-benzene, 3', 3''-diaminoterephthalic acid dianilide, 4', 4''-diaminoisophthalic acid dianilide, 2,5-bis(m- and p-aminophenyl)-1,3,4-oxdiazole, 3,5-bis(m-aminophenyl)-4-phenyl-1,2,4-triazole, 2,5-bis-(p-aminophenyl)-1,3,4-thiadiazole, 5,5-di-(p-aminophenyl)-2,2'-bis(1,3,4-oxdiazolyl), 2,7-diaminophenoxthine, 2,7-diaminophenoxthine-S-dioxide.

Preferably the following diamines are used:

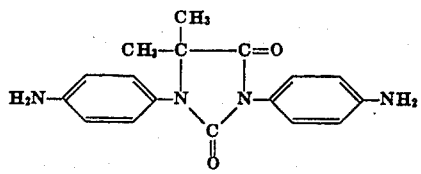

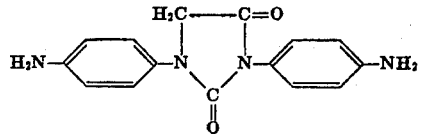

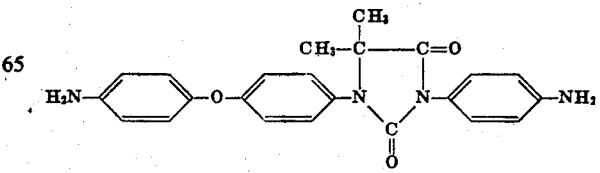

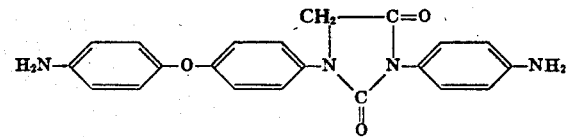

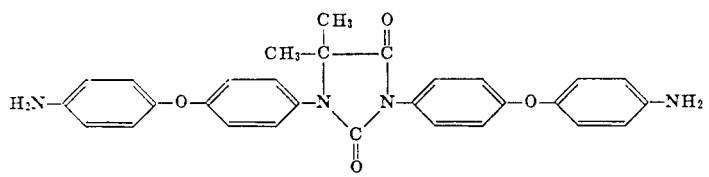
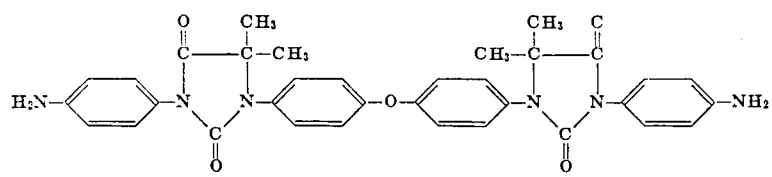
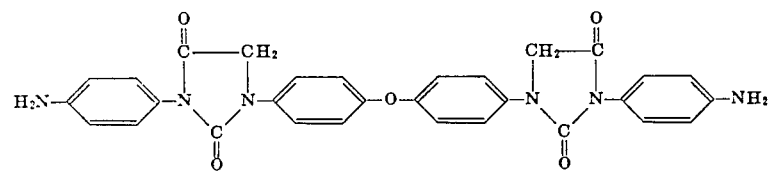
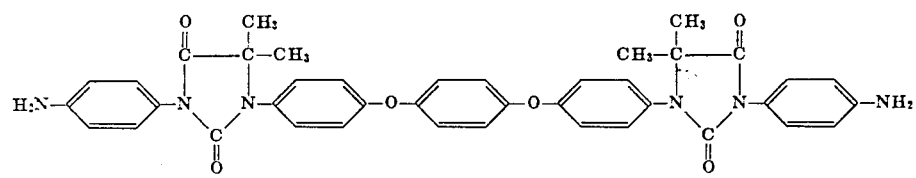
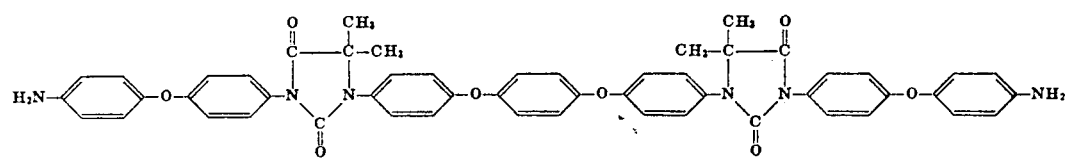
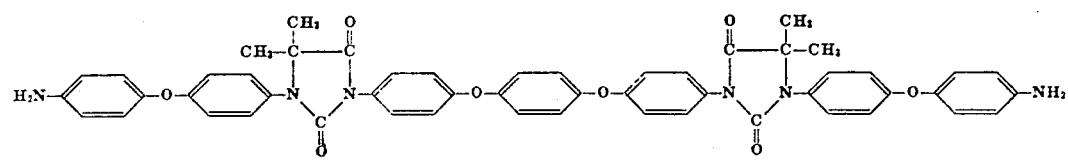
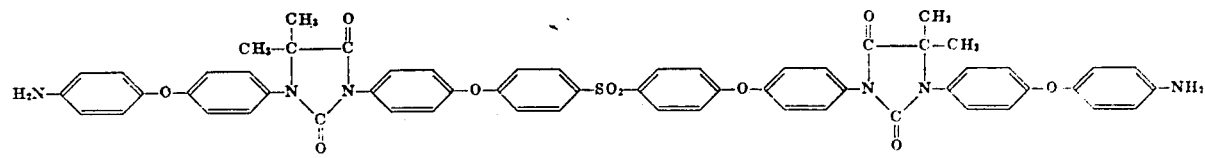
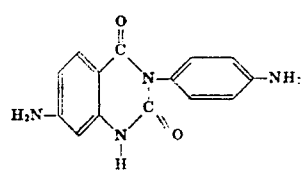

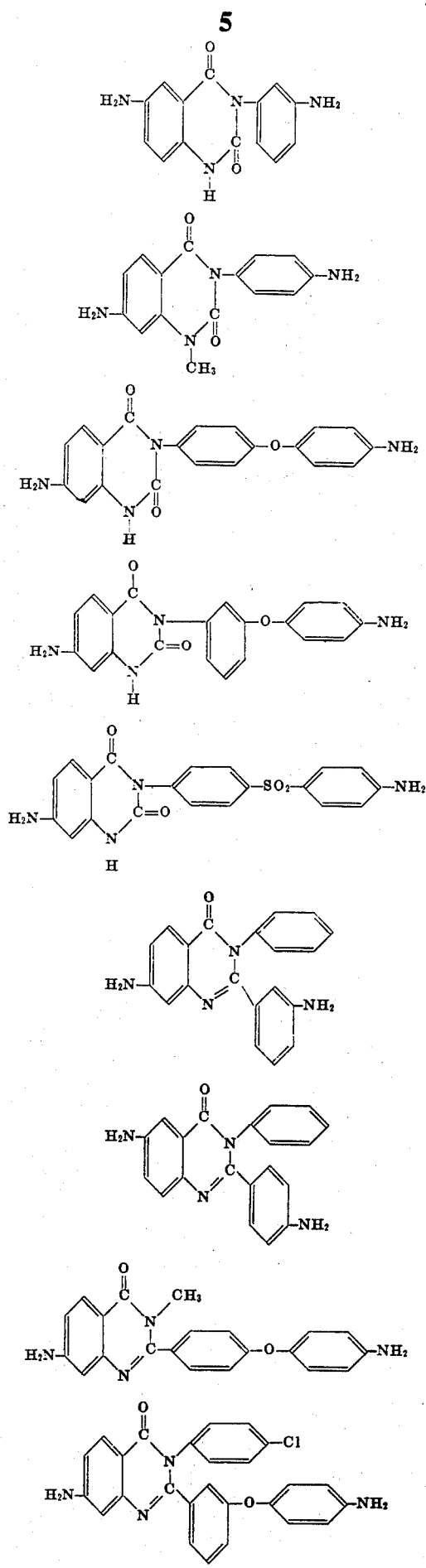

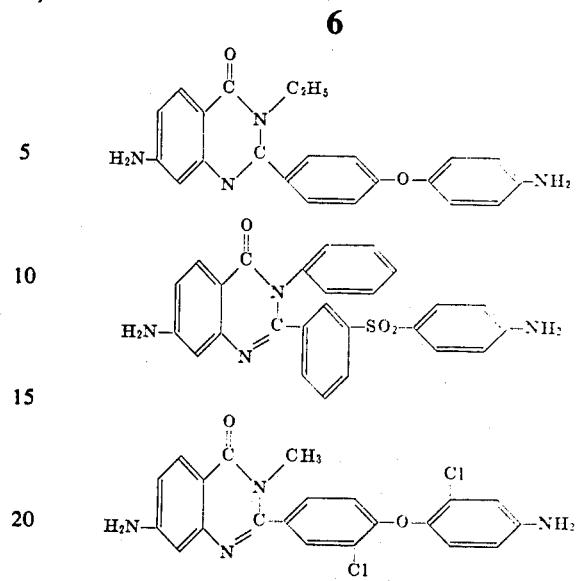

Dicarboxylic acids: Iso- and tere-phthalic acid, 4,4'-benzophenone dicarboxylic acid, 4,4'-diphenyldicarboxylic acid, 1,5- and 2,6-naphthalene dicarboxylic acid, 4,4'-diphenylether dicarboxylic acid, 4,4'-diphenylsulfone dicarboxylic acid, and the corresponding dicarboxylic acids substituted by halogen or alkyl.

The polyamides containing disulphimide structures are prepared by the homopolycondensation or copolycondensation of aromatic diamines or dicarboxylic acid dihalides containing disulphimide groups through interfacial polycondensation or through polycondensation in solution.

The aromatic disulphimides used can correspond to the general formula:

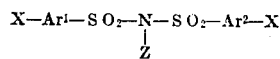

in which each
- X represents an —NH$_2$ group or a —COHal group, in which Hal represents a halogen atom, preferably chlorine or bromine,
- Z represents a hydrogen or an alkali metal atom, and
- Ar$^1$ and Ar$^2$, which can be the same or different, each represents a bivalent aromatic radical consisting of one aromatic ring or of two or more aromatic rings which are fused together or are attached to one another through a direct bond or through a —CH$_2$—, —O—, —S— or —SO$_2$— group, or an alkyl- or halogen-substituted aromatic radical.

Alternatively, the aromatic disulphimide can also correspond to the following general formula:

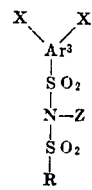

in which
- X and Z are as defined above,
- R represents a C$_1$ and C$_4$ alkyl radical or an optionally alkyl- or halogen-substituted aromatic radical, while
- Ar$^3$ represents a trivalent aromatic radical, which can also consist of one aromatic ring or of two or more aromatic rings which are fused together or are attached to one another through a direct bond or through a —CH$_2$—, —O—, —S—, or —SO$_2$— group, or an alkyl or halogen-substituted aromatic radical, preferably corresponding to the following formulas:

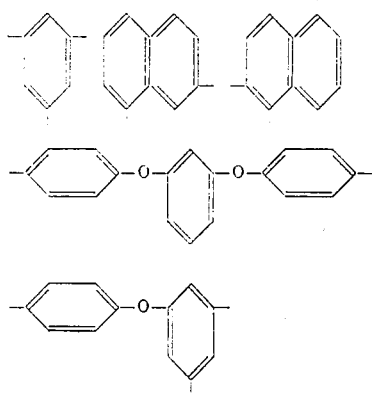

For example, the following disulphimides which correspond to the above formulas can be used:

4,4'-diamino-diphenyl disulphimide
3,3'-diamino-diphenyl disulphimide
3,4'-diamino-diphenyl disulphimide
3,3'-diamino-4,4'-dichlorodiphenyl disulphimide
4,4'-diamino-3,3'-dichlorodiphenyl disulphimide
3,3'-diamino-4-chlorodiphenyl disulphimide
diphenyl disulphimide-4,4'-dicarboxylic acid dichloride
diphenyl disulphimide-3,3'-dicarboxylic acid dichloride
diphenyl disulphimide-3,4'-dicarboxylic acid dichloride
4-(p-aminophenoxy)-3'-aminodiphenyl disulphimide
5-aminophenyl-4'-aminonaphthyl-(1)-disulphimide
3,5-diaminodiphenyl disulphimide
3,5-diamino-5-chlorodiphenyl disulphimide
3,5-diaminophenyl methyl disulphimide
diphenyl disulphimide-3,5-dicarboxylic acid dichloride
phenylmethyl disulphimide-3,5-dicarboxylic acid dichloride
1,5-diamino-naphthyl-(3)-phenyl disulphimide
1,4-diamino-naphthyl-(6)-phenyl disulphimide, or
1,5-diamino-naphthyl-(3)-methyl disulphimide.

The disulphimides described above can be obtained by reacting sulphonic acid chlorides with sulphonic acid amides in alkaline medium [Ber. 75, 532 (1942)] or by reacting sulphonyl thionylamines with sulphonic acids (German Pat. specification No. 1,235,300).

The homopolyamides or copolyamides containing disulphimide groups, used as additives to the high molecular weight aromatic polyamides to obtain the polyamide composition of matter according to the invention are preferably obtained by polycondensation in solution, although they can also be prepared by interfacial condensation. In the preferred procedure, a diamine containing the disulphimide group is introduced into a polar organic solvent, either on its own or together with a heterocycle-containing diamine (although the disulphimide diamine should be present in a quantity of at least 30 mol percent, based on the total quantity of diamine), followed by the gradual addition in portions of the aromatic dicarboxylic acid dihalide. It is also possible, however, initially to introduce a fully aromatic or an aromatic heterocycle-containing diamine into a polar organic solvent and then to add a disulphimide-containing dicarboxylic acid dihalide, either on its own or in admixture with other aromatic dicarboxylic acid dihalides, gradually and in portions. In this case, too, the disulphimide-containing dicarboxylic acid dihalide should be present in a quantity of at least 30 mol percent, based on the total quantity of the dicarboxylic acid dihalides.

It is in the interests of the invention that the copolyamides containing disulphimide structures should contain as many disulphimide groups as possible. Accordingly, it is necessary to use as high as possible a percentage component of a disulphimide diamine, based on the total quantity of diamine, or of a dicarboxylic acid dichloride containing the disulphimide group, based on the total quantity of dicarboxylic acid dichloride, but at least 30 mol percent.

Examples of suitable polar organic solvents include N,N-dialkyl carboxylic acid amides, for example N,N-dimethyl acetamide, and N-substituted lactams, for example N-methyl pyrrolidone. The major advantage of these solvents is that it is possible to operate in the absence of additional acid acceptors. In order to obtain reaction products with the highest possible molecular weight, it is best to use the diamine component and the dicarboxylic acid dihalide component in equivalent or substantially equivalent quantities. Condensation is carried out at temperatures of from −30° to +150°C, and preferably at temperatures of from −10° to +50°C. The reaction times can range from 1 to 30 hours. The solutions have a solids content of from 5 to 40 percent by weight and preferably from 10 to 25 percent by weight.

If the diamines and dicarboxylic acid dihalides have such structures that, together, they form polyamides that are insoluble in polar organic solvents, up to 5 percent by weight (based on the quantity of solvent) of an alkali metal salt or alkaline earth metal salt, preferably LiCl or $CaCl_2$, must be added as solution promoter before or during polycondensation in order to prevent the polyamide formed from being precipitated from the solution.

These novel polyamides containing disulphimide structures consist of 30 to 100 mol percent (based on the total quantity of the structural segments derived from the diamines or from the dicarboxylic acid dihalides) of structural segments containing a disulphimide group corresponding to the general formulas:

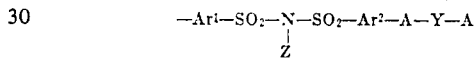

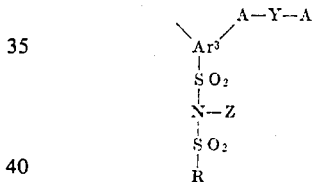

in which
Ar$^1$ and Ar$^2$, which can be the same or different, each represents a bivalent aromatic radical consisting of one aromatic ring or of two or more aromatic rings which are fused together or are attached to one another through a direct bond or through a $-CH_2-$, $-O-$, $-S-$ or $-SO_2-$ group, or an alkyl- or halogen-substituted aromatic radical,
Ar$^3$ represents a trivalent aromatic radical, which can also consist of one aromatic ring or of two or more aromatic rings which are fused together or are attached to one another through a direct bond or through a $-CH_2-$, $-O-$, $-S-$, or $-SO_2-$ group, or an alkyl or halogen-substituted aromatic radical,
R represents a $C_1$ to $C_4$ alkyl radical or an optionally alkyl-substituted or halogen-substituted radical,
Y represents a divalent aromatic radical,
Z represents a hydrogen or an alkali metal atom, and
A represents an amide group of the formula $-CONH-$ or $-NHCO-$, and of up to 70 mol percent of structural segments of known fully aromatic or aromatic heterocycle-containing polyamides.

The homopolyamides and copolyamides are colorless or substantially colorless and have high or less high molecular weights, depending upon the structure of the monomeric units. Polyamides with high molecular weights can be converted by known methods into shaped articles such as filaments, fibers or bristles. According to the invention, however, the main application intended for these polyamides (unaffected by whether the molecular weights are very high or low) is that they should be added to known fully aromatic or aromatic heterocycle-containing polyamides in proportions of from 3 to 30 percent by weight, and preferably from 5 to 15 percent by weight, depending upon the disulphimide group content, in order to impart to them an affinity for basic dyes. Dyed textiles prepared from copolyamides of this kind are extremely fast to washing.

EXAMPLE 1 a. Preparation of the disulphimide compound

Two hundred Parts by weight of a 20 percent by weight sodium hydroxide solution were added to a suspension of 202 parts by weight of m-nitrobenzene sulphonamide in 1200 parts by weight of water. A solution of 242 parts by weight of m-nitrobenzene sulphochloride in 400 parts by weight of acetone and 210 parts by weight of a 20 percent by weight sodium hydroxide solution were simultaneously added dropwise at room temperature at such a rate as to maintain a pH value of from 10 to 11. After stirring for 2 hours at 50°C, the reaction mixture was cooled and filtered under suction, and the product was washed with sodium hydroxide and water. The residue is sodium di-(m-nitrophenyl)-disulphimide (melting point 254° to 255°C) from which sodium di-(m-aminophenyl)-disulphimide melting at 285° to 287°C is obtained by catalytic hydrogenation.

b) Preparation of the polyamide spinning solution

Solution I: 134 Parts by weight of 3-(p-aminophenyl)-7-amino-(1H,3H)-quinazolin-2,4-dione were introduced into 950 parts by weight of absolute N-methyl pyrrolidone. 101.5 Parts by weight of isophthaloyl dichloride were then added in portions with continuous stirring at 5° to 10°C and the resulting highly viscous solution was stirred for another 12 hours at room temperature.

Solution II: In the meantime, a solution of a copolycondensate was similarly prepared from 10.7 parts by weight of 3-(p-aminophenyl)-7-amino-(1H,3H)-quinazolin-2,4-dione, 13.5 parts by weight of sodium di-(m-aminophenyl)-disulphimide and 16.2 parts by weight of isophthaloyl dichloride in 122 parts by weight of absolute N-methyl pyrrolidone. Solution II was stirred into Solution I.

c. Preparation of filaments

This spinning solution, having a viscosity of 3,250 poises at 20°C ($\eta_{rel} = 2.05$ as measured on a 0.5 percent by weight solution in N-methyl pyrrolidone at 20°C) was spun through a 10-bore spinneret (diameter 0.1 mm) into a precipitation bath (bath temperature 20°C) comprising 70 parts by weight of water and 30 parts by weight of dimethyl acetamide. The filaments were run off from the spinneret at a rate of 10 meters per minute, subsequently washed in water at 20°C and finally pre-stretched at a ratio of 1 : 1.5 in boiling water. After drying, the filaments were stretched at a ratio of 1:1.5 at 350° to 380°C over a 30 cm long heating frame. Highly heat-stable filaments having a tensile strength of 3.9 to 4.3 g/dtex at 5 percent elongation are obtained.

d. Dyeing of the filaments

Ten g fiber batches of this polyamide and of the unmodified homopolycondensate of 3-(p-aminophenyl)-7-amino-(1 H,3H)-quinazolin-2,4-dione and isophthaloyl dichloride were dyed at 120°C with a 5 percent by weight solution of the red azo dye

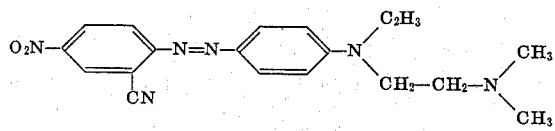

quarternized with dimethyl sulphate. The solution was adjusted to pH 4.5 and heated for 1.5 hours at 120°C. After dyeing, the strands were after-treated at 50°C with a 0.2 percent by weight aqueous solution of sodium bisulfit.

In order precisely to determine the improvement in dyeability, 500 mg batches of the treated fibers were dissolved in 25 cc of dimethyl acetamide and the extinction values at 475 m$\mu$ compared with pure dimethyl acetamide were measured in a photometer (BFK, a product of Messrs. Kipp & Zonen). The extinction values were E = 1.7 for the disulphimide-modified polyamide and E = 0.15 for the unmodified homopolycondensate.

EXAMPLE 2 a. Preparation of the disulphimide compound

Two hundred Parts by weight of a 20 percent by weight sodium hydroxide solution were added to a suspension of 236.5 parts by weight of 4-chloro-3-nitrobenzene sulphonamide in 1000 parts by weight of water. A solution of 242 parts by weight of 4-chloro-3-nitrobenzene sulphochloride in 300 parts by weight of acetone and 210 parts by weight of a 20 percent by weight sodium hydroxide solution were then simultaneously added dropwise at room temperature at such a rate as to maintain a pH value of from 11 to 12. After stirring for 2 hours at 50°C, the reaction mixture was cooled, sodium di-(4-chloro-3-nitrophenyl)-disulphimide (m.p. 311° to 313°C) was filtered off under suction and washed with sodium hydroxide. Sodium di-(4-chloro-3-aminophenyl)-disulphimide melting at 298° to 300°C was smoothly obtained from this dinitro compound by catalytic hydrogenation.

b. Preparation of the polyamide spinning solution

Solution I: 134 Parts by weight of 3-(p-aminophenyl)-7-amino-(1H,3H)-quinazolin-2,4-dione were introduced into 970 parts by weight of absolute dimethyl acetamide. 101.5 Parts by weight of isophthaloyl dichloride were then introduced in portions with continuous stirring at 10° to 15°C, and the resulting clear highly viscous solution was stirred for 16 hours at room temperature.

Solution II: In the meantime, a solution of a copolycondensate was similarly prepared from 10.7 parts by weight of 3-(p-aminophenyl)-7-amino-(1H,3H)-quinazolin-2,4-dione, 16.7 parts by weight of sodium di-(3-amino-4-chlorophenyl)-disulphimide and 16.2 parts by weight of isophthaloyl dichloride in 131 parts by weight of absolute N-methyl pyrrolidone. Solution II was stirred into Solution I.

c. Preparation of filaments

This spinning solution, having a viscosity of 2,510 poises at 20°C ($\eta_{rel} = 1.9$ as measured on a 0.5 percent by weight solution in N-methyl pyrrolidone at 20°C) was spun through a 10-bore spinneret into an aqueous precipitation bath to form filaments. The filaments were run off at a rate of 10 meters per minute. After stretching for 2 hours in boiling water and then on a frame heated at 260° to 280°C to a final stretching ratio of 1:2.3, filaments with a tensile strength of from 4.0 to 4.5 g/dtex were obtained.

d. Dyeing of the filaments

Comparative dyeing was also carried out with these polyamide filaments in the manner described in Example 1d). The solution of the filaments, dyed with the same dye as in Example 1d) in dimethyl acetamide had an extinction of E = 2.4 (as against E = 0.15 for the solution of the unmodified homopolymer).

EXAMPLE 3 a. Preparation of the disulphimide compound

Three hundred Parts by weight of a 20 percent by weight sodium hydroxide solution were added to a suspension of 303 parts by weight of 3-nitrobenzene sulphonamide in 1,600 parts by weight of water. A solution of 384 parts by weight of 4-chloro-3-nitrobenzene sulphochloride in 500 parts by weight of acetone and 300 parts by weight of a 20 percent by weight sodium hydroxide solution were then simultaneously added dropwise at room temperature at such a rate as to maintain a pH value of from 10 to 11. After stirring for 1 to 2 hours at about 50°C, the reaction mixture was cooled, filtered under suction and washed with sodium hydroxide and water. The residue was 4-chloro-3-nitrophenyl-3'-nitrophenyl disulphimide (melting point 246° to 247°C) from which 4-chloro-3-aminophenyl-3'-aminophenyl disulphimide was smoothly obtained by catalytic hydrogenation.

b. Preparation of the polyamide spinning solution

Solution I: 155 Parts by weight of 1,3-bis-(p-aminophenyl)-5,5-dimethyl hydantoin were dissolved in 800 parts by weight of absolute dimethyl acetamide, and 101.5 parts by weight of isophthaloyl chloride were gradually added with stirring at 5° to 10°C. The solution was stirred for 16 hours at room temperature and then mixed with Solution II, which was obtained by polycondensing 12.4 parts by weight of 1,3-bis-(p-aminophenyl)-5,5-dimethyl hydantoin, and 15.3 parts by weight of sodium-4-chloro-3-aminophenyl-3'-aminophenyl disulphimide with 16.2 parts by weight of isophthaloyl chloride in 132 parts by weight of absolute dimethyl acetamide.

c. Preparation of the filaments

This viscous spinning solution ($\eta = 1,850$ poises, $\eta_{rel} = 1.65$, as measured on a 0.5 percent by weight solution of the polyamide in N-methyl pyrrolidone) was wet-spun through a 10-bore spinneret (bore diameter 0.1 mm). The filaments were run off at a rate of 10 to 15 meters per minute. Water at 20°C was used as the precipitation bath. After washing, the filaments were stretched in boiling water at a ratio of 1:1.5, dried and then stretched at a ratio of 1:1.5 at 330° to 350°C on a stretching frame. Filaments of outstanding thermal stability with a tensile strength of 3.8 to 4.2 g/dtex at 7 percent elongation were obtained.

d. Dyeing of the filaments

Comparative dyeing was carried out by the method described in Example 1d). As described in Example 1d), the extinction of a solution of the filaments dyed with the same dye as in Example 1d) was measured, as was E = 2.2 (compared with E = 0.18 for the solution of the unmodified homopolycondensate of 1,3-bis-(p-aminophenyl)-5,5-dimethyl hydantoin and isophthaloyl dichloride).

What we claim is:

1. A polyamide composition of matter that can be dyed with basic dyestuffs comprising a conventional high molecular weight aromatic fiber forming polyamide, containing repeating carbonamide groups as an integral part of the polymeric chain separated by a member selected from the group consisting of aromatic and aromatic heterocyclic moieties and from 3 to 30 percent by weight, based on the composition as a whole of a polyamide which comprises from 30 to 100 mol. percent of disulfoneimide segments of the formula:

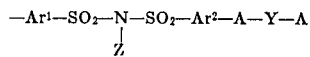

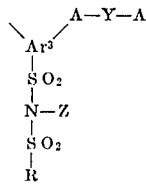

wherein each symbol

A represents a group of the formula —CONH— or —NHCO—,

Z represents a hydrogen or alkali metal atom,

R represents a $C_1$ to $C_4$ alkyl radical or an aromatic, alkyl-substituted aromatic or halogen-substituted aromatic radical, $Ar^1$ and $Ar^2$, which can be the same or different, each represents a bivalent aromatic, alkyl-substituted aromatic or halogensubstituted aromatic radical, $Ar^3$ represents a trivalent aromatic, alkyl-substituted aromatic or halogen-substituted aromatic radical, and Y represents a divalent aromatic radical and from 0 to 70 mol percent of said conventional aromatic polyamide segments.

2. The polyamide composition of claim 1, wherein said 3 to 30 percent by weight of a polyamide comprises from 30 to 100 mol. percent of disulfoneimide segments of the formula

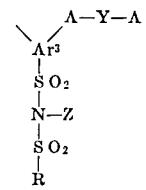

wherein $Ar^3$ represents a radical of the formula:

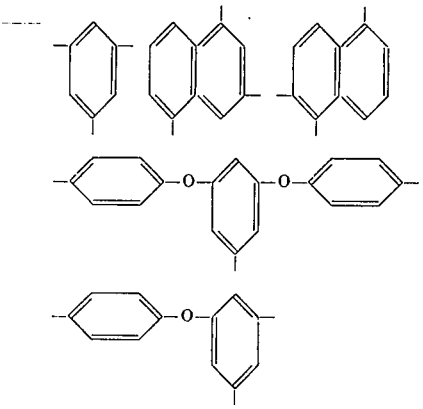

and A, R, Y and Z have the meaning as given in claim 1, and from 0 to 70 mol. percent of conventional aromatic polyamide segments.

3. A method for producing a polyamide composition of matter according to claim 1.) which comprises adding from 3 to 30 percent by weight of a polyamide according to claim 3.), to a conventional aromatic polyamide.

* * * * *